No. 719,680. PATENTED FEB. 3, 1903.
D. J. LYNCH.
SEWAGE TRAP.
APPLICATION FILED MAY 1, 1902.
NO MODEL.

WITNESSES
INVENTOR

UNITED STATES PATENT OFFICE.

DENNIS J. LYNCH, OF BOSTON, MASSACHUSETTS.

SEWAGE-TRAP.

SPECIFICATION forming part of Letters Patent No. 719,680, dated February 3, 1903.

Application filed May 1, 1902. Serial No. 105,431. (No model.)

*To all whom it may concern:*

Be it known that I, DENNIS J. LYNCH, a citizen of the United States, and a resident of Boston, in the county of Suffolk and State of Massachusetts, have invented a new and useful Improvement in Sewage-Traps, of which the following is a full, clear, and exact description, reference being had to the accompanying drawings, forming a part of this specification, in explaining its nature.

My invention relates to an improvement in sewage-traps.

It is customary for plumbers to use in their business several kinds of trap, the more common of which includes the common pot or round trap, with its ordinary water seal interposed between the inlet and outlet pipes, the grease-trap, which in addition to the water seal permits of the accumulation of grease, and a trap which has a water-pressure upon its cover. These different kinds of trap are not only used depending upon their aptitude for place or condition, but in certain localities the plumbage laws specially demand that a certain kind of trap be used. The plumber is therefore put to the inconvenience and expense of providing the different kinds of trap to satisfy the varying conditions.

Accordingly it is my object by my invention to provide a simple inexpensive means which may be converted or built up, as it were, into any one of the three kinds of trap before made mention of and as occasion may require.

My invention comprises, therefore, a series of sectional parts which in triform combination make the different kinds of trap aforesaid.

I will now describe my invention in connection with the accompanying drawings, which form a part of this specification, and in which—

Figure 1:
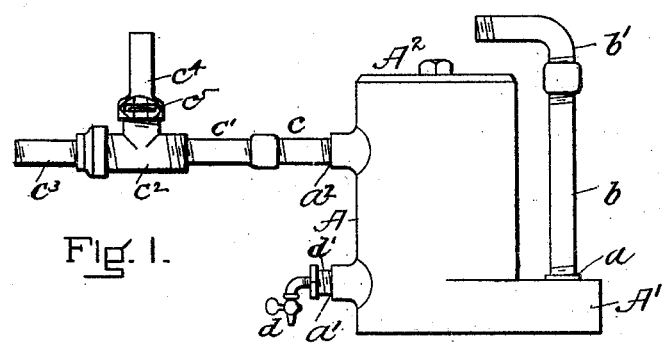
Figure 4:
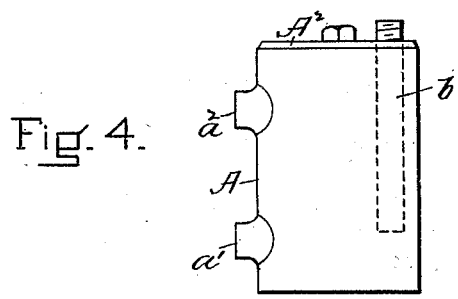
Figure 2:
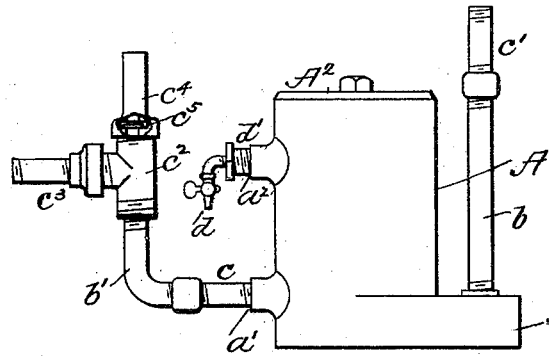
Figure 3:
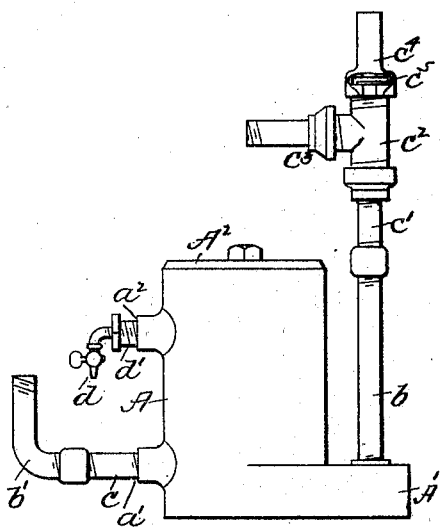

Figure 1 shows my invention as comprising a round or pot trap; Fig. 2, as comprising a grease-trap; Fig. 3, as comprising a trap with water-pressure upon its cover. Fig. 4 shows a modification in the construction of the sectional body member.

A represents the shell or section which forms the body of the various traps. This body-section is preferably cylindrical in shape in order that its interior chamber may have a rounded wall to prevent clogging of the waste material and is made of lead, iron, copper, or, in fact, any substance which may be safely threaded. At one side, near its bottom, it has the extension A′, which has the threaded opening $a$ in its upper surfacing. From the other side of the body A are the openings $a'\ a^2$, one from near the bottom and the other from near the top of the chamber. These openings are also threaded, and in this connection it is to be observed that not only is the body of my trap made of a substance to bear threading, but is reinforced at the several points where such connection is made. This reinforcement preferably takes the form of a slight tubular extension, along the interior of which a thread is cut. This makes a threaded section of some considerable length and strengthens the connection made very materially. The top of the trap is also threaded and receives the screw-cover $A^2$, which is made, preferably, of brass.

Thus far I have described simply a cylindrical chamber having a cover and lower end extension, but so provided with threaded openings that, with the convertible connections of which I shall hereinafter make mention, it may be transformed into any one of three kinds of sewage-trap.

The common round or pot trap is shown in Fig. 1. The general form of this trap comprises a main trap-body having an inlet arm-passage at one side near the bottom of the trap-chamber and an outlet-passage from the other side some little distance from its top. Between these two passages is formed the water seal. Accordingly for making an inlet-passage connection with the body-section A, or rather its extension A′, I have shown the pipe $b$, which is of brass or galvanized iron cut long or short and at its lower end screwing into the threaded opening $a$. In connection with this pipe $b$ the adaptability of the side extension A′ is to be observed. Primarily by so extending the trap-body a straight joint can be made with the inlet-pipe; otherwise a bent coupling would have to be employed. This is important when we are endeavoring to construct a trap on lines of economy and convenience. The essential advantage, however, of the extension A′ is in the fact that as the inlet-pipe extends vertically into the trap-body and with a screw connection the body of the trap may be swung horizontally in any direction upon the inlet-pipe as a center and traversing a circle approximately twice the diameter of the trap-body. By this adjustment the body-section of the trap may be turned to any position of advantage, especially with relation to the extension of the outlet-pipe. Screwing upon the upper end of the pipe $b$ is the bent coupling $b'$. This also by reason of its screw connection with the end of the pipe may be turned in any direction, and so be made to assume a position where the extension of the inlet-pipe will most easily connect with it. The outlet pipe or arm comprises the brass nipple $c$, which screws into the opening $a^2$ near the top of the trap-body. Connected with this is the brass coupling $c'$, which is male-threaded at its outer end to screw into the inner end of the T $c^2$. The outer end and branch of the T are male-threaded, the outer end receiving into the coupling $c^3$, from which may be extended the outlet-pipe, while to the branch of the T $c^2$ is screwed the coupling $c^4$, which forms a vent, or rather connects with a vent-pipe. This vented outlet is used to prevent siphonage or to conform to certain legal requirements in connection with this kind of fixture. If an unvented fixture is desired, however, a solid washer $c^5$ may be inserted into the coupling end of the joint $c^4$, and this when the coupling is made makes a water-tight connection. To secure the vented fixture when this washer is used, a hole may be cut through the washer of any desired size. $d$ represents a petcock which connects with the interior of the trap-body near its bottom through the plug $d'$ and the opening $a'$. The petcock is used to draw off the water seal in order that the trap-body may be cleaned out, which of course can be done when the cover $A^2$ is removed. Another very material advantage which I obtain from the use of a petcock for the withdrawal of water consists in the fact that if the outlet-pipe be stopped up and the accumulating water backs up into the trap-body, so as to bear with force against its cover, as well as remaining stagnant throughout the length of the inlet-pipe, this water may be drawn off through the petcock, so that the cover may be safely taken off and the obstruction removed from the outlet-pipe without danger of an overflow, and in this connection I wish to refer generally to this advantageous use of a petcock, not especially with reference to a round trap, but with reference also to the other trap combinations, of which I shall hereinafter make mention, or, in fact, any kind of sewage-trap. It is therefore to be observed that the trap which has thus been described is made up of a main body-section and a number of sectional parts which collectively bear such relation to one another as to form a trap combination.

In Fig. 2 I have shown the main body A and its connections converted into a grease-trap, the essential characteristic of which is that the inlet and outlet passages are so relatively connected by the trap-body that grease from the sewage-water may be accumulated therein. In order to accomplish this, I use the same inlet-pipe $b$, connecting with the body extension $A'$. To this is joined the coupling $c'$, which makes connection with the extension of the inlet-pipe. The trap can be turned to any position of advantage, as before described. From the other side of the trap extends the outlet-pipe. This connects with the body of the trap through the opening $a'$ near its bottom instead of through the opening $a^2$, as in the construction previously described. The outlet-pipe is extended up sufficiently to determine the desired level of water in the trap, which permits of the accumulation of grease at its top, and then off at one side. I am enabled to make this outlet-pipe extension with the sectional members still remaining which were used in the formation of the round trap and without further change in the trap-body. It accordingly comprises the brass nipple $c$, screwing into the threaded outlet $a'$ and forming the opening-outlet connection. To this is attached the bent coupling $b'$, which makes the outer and upward extension of the pipe. This screws into the T $c^2$, the branch of which extending laterally is adapted to connect with the side extension $c^3$ of the outlet-pipe, while its upwardly-extending end receives the coupling $c^4$, which forms or makes connection with the vent-pipe. The solid washer may be used, as before described. Into the upper threaded opening $a^2$ is screwed the plug $d'$, which supports the petcock $d$, which in case of the stoppage of the outlet-pipe performs the very material function before made mention of.

In Fig. 3 I have converted my body-section A and its interchangeable connections into a trap in which a water-pressure is continually retained on its cover, so that one taking the cover off in order to replace it must make a perfect water-tight connection. The law in some localities specially calls for just this kind of trap. In order to obtain the water-pressure, the outlet-pipe must be extended above the body-section before a lateral extension is made. Accordingly I employ the long pipe-section $b$, which with the coupling $c'$ and T $c^2$ makes a sufficient upward extension that the branch of the T may extend laterally from above the trap. To this laterally-extending branch of the T is attached the coupling $c^3$, which connects with any further extension of the outlet-pipe. The upper extending end of the T receives the coupling $c^4$, which forms the vent. The inlet-pipe connects with the lower threaded opening $a'$ in the trap-body through the bent coupling $b'$ and the nipple $c$. With this construction the petcock $d$ and the connecting-plug $d'$ may be used at the opening $a^2$. When used, a sufficient amount of water may be withdrawn to release the water-pressure and the cover $A^2$ removed.

I have shown in Fig. 4 a slight modification in the construction of the sectional member A, which forms the trap-body, in that the lower end side extension $A'$ is entirely eliminated. Instead, therefore, of the pipe-section $b$ making connection with the extension $A^2$ outside the sectional body it passes down through the cover $A^2$ and for some distance within the trap-body. Where the pipe passes through the cover, as at $a^4$, of course a watertight connection must be made, which preferably is of a threaded character in order that the trap-body may be turned upon the pipe, as before described, to any position of advantage.

As for the triform trap combination of the remaining sectional connections, it may be as before described and represented, although any other modification in their arrangement may be made.

While I have shown a series of couplings or pipe connections of specific form, other connections convertible as described may be employed and still be within the scope of my invention, the essential feature of which comprises a body-section adapted to make connection with a series of convertible parts, the combination of which constitute the different kinds of sewage-traps before made mention of. Besides the convertibility of these sectional parts into the various trap combinations or their being interchangeable and adjustable, depending upon the variations of place or condition, their utility is also apparent in the fact that if they are combined to form a trap combination in one place they may be taken out and again used in an entirely different place, either in the same or a different combination or condition of adjustment.

Having thus fully described my invention, I claim and desire to secure by Letters Patent of the United States—

1. A sewage-trap comprising a central body-section and a series of convertible sections adapted to form therewith a triform trap combination.

2. A sewage-trap comprising a body-section provided with threaded openings, and a number of convertible sections adapted to make connection therewith, substantially as and for the purposes set forth.

3. A sewage-trap comprising a body-section having a screw-cover and provided with threaded side openings for the reception of the inlet and outlet pipes, and a series of sectional members comprising said pipes or arms, and convertible, as and for the purposes set forth.

4. A sewage-trap having a screw-cover, and the threaded openings $a$, $a'$, $a^2$ adapted to nterchangeably form connection with an inet or outlet pipe, and interchangeable sectional members adapted to make connection therewith, and form a corresponding inlet or outlet pipe, substantially as described.

5. A sewage-trap having a body-section provided with a screw-cover, threaded openings for the inlet and outlet passages, and an opening for the passage and withdrawal of the water seal, and sectional members adapted to make an interchangeable connection with the body-section through said openings and with each other and form the said passages, substantially as described.

6. A sewage-trap comprising a body-section having a screw-cover, and provided with threaded side openings for the reception of inlet and outlet pipes, and a petcock also making threaded connection therewith, as and for the purposes set forth.

DENNIS J. LYNCH.

In presence of—
J. M. DOLAN,
SAUL SIPPERSTEIN.